United States Patent
Yaghi et al.

(10) Patent No.: US 11,697,925 B2
(45) Date of Patent: Jul. 11, 2023

(54) ACTIVE ATMOSPHERIC MOISTURE HARVESTER

(71) Applicant: The Regents of the University of California, Oakland, CA (US)

(72) Inventors: Omar M. Yaghi, Berkeley, CA (US); Mathieu S. Prevot, Berkeley, CA (US); Nikita Hanikel, Berkeley, CA (US); Eugene A. Kapustin, Berkeley, CA (US); Farhad Fathieh, Bekeley, CA (US)

(73) Assignee: The Regents of the University of California, Oakland, CA (US)

( * ) Notice: Subject to any disclaimer, the term of this patent is extended or adjusted under 35 U.S.C. 154(b) by 391 days.

(21) Appl. No.: 17/164,620

(22) Filed: Feb. 1, 2021

(65) Prior Publication Data

US 2021/0156124 A1    May 27, 2021

Related U.S. Application Data

(63) Continuation of application No. PCT/US2019/046252, filed on Aug. 13, 2019.

(60) Provisional application No. 62/718,895, filed on Aug. 14, 2018.

(51) Int. Cl.
| | |
|---|---|
| *B01D 53/26* | (2006.01) |
| *B01J 20/22* | (2006.01) |
| *B01D 53/04* | (2006.01) |
| *E03B 3/28* | (2006.01) |
| *B01D 53/28* | (2006.01) |
| *B01J 20/34* | (2006.01) |

(52) U.S. Cl.
CPC ............ *E03B 3/28* (2013.01); *B01D 53/0438* (2013.01); *B01D 53/0462* (2013.01); *B01D 53/261* (2013.01); *B01D 53/265* (2013.01); *B01D 53/28* (2013.01); *B01J 20/226* (2013.01); *B01J 20/3425* (2013.01); *B01J 20/3483* (2013.01); *B01D 2253/204* (2013.01); *B01D 2257/80* (2013.01); *B01D 2259/402* (2013.01)

(58) Field of Classification Search
CPC .. B01D 5/00; B01D 53/0438; B01D 53/0462; B01D 53/04; B01D 53/261; B01D 53/265; B01D 53/28; B01D 2253/204; B01D 2257/80; B01D 2259/402; B01J 20/226; B01J 20/3425; B01J 20/3433; B01J 20/3458; B01J 20/3483; B01J 2220/606; E03B 3/28; Y02A 20/00
USPC .... 95/117, 121, 126; 96/108, 111, 121, 122, 96/143, 144; 34/80, 472, 473
See application file for complete search history.

(56) References Cited

U.S. PATENT DOCUMENTS

| | | | | |
|---|---|---|---|---|
| 4,304,577 A | * | 12/1981 | Ito | B01D 53/261 96/127 |
| 2005/0044862 A1 | * | 3/2005 | Vetrovec | B01D 53/265 62/93 |

(Continued)

*Primary Examiner* — Frank M Lawrence, Jr.
(74) *Attorney, Agent, or Firm* — Richard Aron Osman (57) ABSTRACT

Atmospheric moisture harvester systems include two beds with water capture material, such as metal-organic framework (MOF), a heater, two fans, and a condenser having two sides, operatively configured into adsorption and desorption modes, wherein the MOF beds are interchangeable to cycle between the desorption and water adsorption modes. The systems may further include a photovoltaic panel powering the fans and condenser.

22 Claims, 6 Drawing Sheets

(56) References Cited

U.S. PATENT DOCUMENTS

| | | | |
|---|---|---|---|
| 2006/0130652 A1* | 6/2006 | Takewaki | B01D 53/28 95/148 |
| 2013/0192281 A1* | 8/2013 | Nam | F28D 17/00 62/476 |
| 2014/0287150 A1* | 9/2014 | Miljkovic | C23C 16/4414 427/458 |
| 2017/0354920 A1* | 12/2017 | Switzer | E03B 3/28 |
| 2018/0171604 A1* | 6/2018 | Kim | B01J 20/3204 |
| 2019/0234053 A1* | 8/2019 | Kim | B01J 20/103 |
| 2020/0283997 A1* | 9/2020 | Salloum | E03B 3/28 |
| 2022/0170247 A1* | 6/2022 | Yaghi | B01D 53/0415 |

* cited by examiner

ACTIVE ATMOSPHERIC MOISTURE HARVESTER

CROSS-REFERENCE TO RELATED APPLICATIONS

This application claims priority to U.S. Provisional Patent Application No. 62/718,895, filed Aug. 14, 2019, which is incorporated herein by reference in its entirety.

INTRODUCTION

Water scarcity is expected to worsen as the global population continues to grow and the Earth's average temperature keeps rising, leading to substantial challenges in accessing water resources and associated water services by 2025[1]. Over the past few years, several conceptual and action frameworks have been implemented, prioritizing proactive policy (e.g. expansion of facilities, new water-pricing policies) and the development of innovative technologies (e.g. desalination, water harvesting from the fog) to cope with the water crisis[2-5]. However, reliable water production technologies are yet to be developed and implemented, especially for dry regions, to address future water scarcity.

Current technologies for dewing water from moist air[5-8] and fog[2-4] require either the frequent occurrence of 100% relative humidity (RH) or a large energy input, which hinders their application in most locations, and prevents use in desert environments[9].

A MOF-based passive atmospheric moisture harvester containing a MOF-801 sorbent has been developed[10]. This fully passive device (i.e. with no required energy input) can produce liquid water in the order of 0.1 liter per kilogram of sorbent per day.

Thus, what is needed in the art are water harvesters that can operate reliably, including in dry regions. Moreover, what is needed are water harvesters that can produce liquid at higher volumes, preferably with low energy input.

SUMMARY OF THE INVENTION

In some aspects, the invention disclosed herein is directed to active atmospheric moisture harvesters that can produce water from arid air using water capture material, such as metal-organic frameworks (MOFs).

In some variations, the active atmospheric moisture harvester relies on highly efficient MOF sorbent to reversibly adsorb and release water from the atmosphere even in arid conditions (e.g., <30% RH). Furthermore, the active atmospheric moisture harvester described herein requires only little energy input, for example, on the order of 100-200 Wh per kilogram of water capture material, which can be easily provided by photovoltaic electricity, as arid environment usually also experience high sunlight intensities, or by any low-grade energy source. Moreover, the active atmospheric moisture harvesters disclosed herein can produce volumes of liquid water of >1 liter per kilogram of sorbent (or water capture material) per day.

Provided herein are methods, devices and systems to extract and condense water from arid (typically <30% relative humidity) air through continuous sorption-desorption cycles. In one aspect, provided is a solar-powered stand-alone device comprising beds of highly porous and water-stable metal-organic framework (MOF) as one example of a suitable water capture material.

MOF sorbents present a combination of advantages not found in current commercial materials: i) high water uptake capacity, ii) steep water uptake at low RH (<20% RH), iii) high cycling performance and stability. For instance, while microporous zeolites can exhibit a steep uptake at very low RH, their recyclability is highly energy intensive due to very strong interactions between the adsorbed water and the porous material[11]. In contrast, MOFs present high structural and chemical tunability allowing for tailored water sorption properties unattainable by current commercial sorbents The MOF can selectively and reversibly adsorb water from air, with cycling between absorption and desorption being easily affected by temperature swings—something unattainable with current commercial sorbent materials. To allow for quick temperature and humidity swings, in some embodiments, the active atmospheric moisture harvester also involves a heating element (e.g. solar heater or an electrical resistance), as well as fans and an active cooler unit, which may all be powered by a photovoltaic module, a power generator, or an electrical utility line. The MOF is organized into two beds allowing for water release in one bed while the other one is adsorbing water. This ensures fast cycling of the sorbent and allows the invention to produce larger volumes of liquid water, for example, in excess of 1 L per kilogram of MOF per day from arid air.

In some variations, the atmospheric moisture harvester is powered by a photovoltaic module, and includes active electric components drawing energy from this module (fans, thermoelectric cooler). In other variations, the atmospheric moisture harvester includes active electric components (fans, cooling/condensing unit). In certain variations, the atmospheric moisture harvester comprises a solar pre-heater to heat up and dry up the air used for the desorption cycle, and can be cycled multiple times a day. Depending on the atmospheric conditions at the location of the system, in some variations, the solar heater can be replaced by a resistive element, which may be powered by the photovoltaic module, to yield a more efficient desorption cycle. In certain variations, the system can produce water in excess of 1 L per kilogram of MOF sorbent per day (vs. about 0.15 L for our prior version).

In certain aspects, provided is an atmospheric moisture harvester system comprising two metal-organic framework (MOF) beds, a heater, two fans, and a condenser having two sides, operatively configured into: (a) an adsorption mode wherein ambient air is blown by one of the fans through one of the MOF beds to one side of the condenser, wherein the MOF adsorbs water from the ambient air to form dried air; (b) a desorption mode wherein the hot air is blown by the other fan through the other MOF bed to the other side the condenser, wherein heater heats the air, the heated dried air desorbs water from the MOF, and the humidified air releases the water at the condenser; and wherein the MOF beds are interchangeable to cycle between the desorption and water adsorption modes. In some embodiments of the foregoing, the atmospheric moisture harvester system further comprises a photovoltaic panel, which powers the fans and condenser.

The adsorption mode is the mode in which the water capture material adsorbs moisture from surrounding air. The desorption mode is the mode in which water vapor is released from the at least partially saturated water capture material. It should be understood that the term "desorption" may also be referred to herein as "regeneration".

In certain embodiments:
the heater is a solar heater or an electric heater, and in some variations, powered by a photovoltaic panel, and in one variation, by the same panel which powers the fans;

the ambient air is 30-40° C.;
the heated air is 80-90° C.;
the dried air is <10% relative humidity;
the humidified air is >70% relative humidity; and/or
the system produces 1 liter per kilogram of sorbent per day.

In certain embodiments of the foregoing, the MOF metal is selected from zirconium, nickel, iron, copper, manganese and aluminum, such as: MOF-801 [$Zr_6O_4(OH)_4$(fumarate)$_6$], MOF-841 [$Zr_6O_4(OH)_4(MTB)_3(H_2O)_2$, wherein MTB is 4,4',4'',4'''-methanetetrayltetrabenzoate], aluminum fumarate [Al(OH)(fumarate)], CAU-10 [Al(OH)(benzene-1,3-dicarboxylate)], or MOF-303 [Al(OH)(HPDC), HPDC=1H-pyrazole-3,5-dicarboxylate].

In one aspect, provided is an atmospheric moisture harvester system, comprising: a first moisture sorption unit and a second moisture sorption unit; at least one heating element, positioned either (a) within each moisture sorption unit, or (b) externally to each moisture sorption unit; a condenser, positioned in between the first moisture sorption unit and the second moisture sorption unit; and at least one power source, configured to power the fans and heating element in the system. In some variations, each moisture sorption unit independently comprises: at least one fan, and at least one tray configured to hold water capture material. In some embodiments of the foregoing aspect, each moisture sorption unit is configured to operate in one or more cycles, wherein each cycle comprises an adsorption mode followed by a desorption mode. The condenser is configured to condense the water vapor released from the moisture sorption unit in the desorption mode and to produce liquid water.

In one variation, when one of the moisture sorption units is operating in the adsorption mode, the at least one fan therein is configured to direct surrounding air towards the at least one tray of water capture material, and at least a portion of the water capture material adsorbs moisture from the surrounding air. The at least one fan in the moisture sorption unit in the adsorption mode further directs air out of the moisture sorption unit in the adsorption mode to at least partially cool the side of the condenser adjacent thereto.

In another variation, when the other moisture sorption unit is operating in the desorption mode, the at least one heating element is configured to provide heat that causes release of water vapor from at least a portion of the water capture material.

In certain variations of the foregoing, the moisture sorption units are configured to operate together such that the first moisture sorption unit operates in the adsorption mode when the second moisture sorption unit operates in the desorption mode, and the first moisture sorption unit operates in the desorption mode when the second moisture sorption unit operates in the adsorption mode.

In other aspects, provided are methods of harvesting atmospheric water comprising operating the disclosed moisture harvester systems.

In one aspect, provided is a method of harvesting water from surrounding air using an atmospheric moisture harvester system comprising a first moisture sorption unit, a second moisture sorption unit, and a condenser, wherein the condenser is positioned in between the first moisture sorption unit and the second moisture sorption unit. In some embodiments, the method comprises: directing surrounding air towards at least one tray of water capture material in a first moisture sorption unit of the atmospheric moisture harvester system, wherein the first moisture sorption unit is operating in an adsorption mode, and wherein at least a portion of the water capture material adsorbs moisture from the surrounding air; directing air out of the first moisture sorption unit to at least partially cool the side of the condenser adjacent thereto; heating a second moisture sorption unit of the atmospheric moisture harvester system to release water vapor is released from at least a portion of the water capture material, wherein the second moisture sorption unit is operating in a desorption phase; and condensing the released water vapor using the condenser to produce liquid water.

In some variations of the foregoing aspect, the first moisture sorption unit and the second moisture sorption unit operate together such that the first moisture sorption unit operates in the adsorption mode when the second moisture sorption unit operates in the desorption mode.

In other embodiments, the method further comprises switching modes in the first moisture sorption unit and the second moisture sorption unit after adsorption is completed in the first moisture sorption unit and desorption is completed in the second moisture sorption unit. The first moisture sorption unit then operates in the desorption mode when the second moisture sorption unit operates in the adsorption mode.

The invention encompasses all combination of the particular embodiments recited herein, as if each combination had been laboriously recited.

BRIEF DESCRIPTION OF THE FIGURES

The present application can be best understood by reference to the following description taken in conjunction with the accompanying figures, in which like parts may be referred to by like numerals.

DETAILED DESCRIPTION OF PARTICULAR EMBODIMENTS

The following description sets forth exemplary methods, parameters and the like. It should be recognized, however, that such description is not intended as a limitation on the scope of the present disclosure but is instead provided as a description of exemplary embodiments.

In some aspects, provided herein are active atmospheric moisture harvesters that can harvest water from surrounding air, including in desert environments with low relative humidity.

In one aspect, provided is an atmospheric moisture harvester system comprising: a first moisture sorption unit and a second moisture sorption unit; at least one heating element positioned either (a) within each moisture sorption unit, or (b) externally to each moisture sorption unit; a condenser positioned in between the first moisture sorption unit and the second moisture sorption unit; and at least one power source configured to power the fans and heating element in the system.

In some embodiments, each moisture sorption unit independently comprises: at least one fan, and at least one tray configured to hold water capture material. In some variations, each moisture sorption unit is configured to operate in one or more cycles. Each cycle includes an adsorption mode followed by a desorption mode.

When a given moisture sorption unit is operating in the adsorption mode, the at least one fan in the moisture sorption unit in the adsorption mode is configured to direct surrounding air towards the at least one tray of water capture material, and at least a portion of the water capture material adsorbs moisture from the surrounding air. The at least one fan in the moisture sorption unit in the adsorption mode further directs air out of the moisture sorption unit in the adsorption mode to at least partially cool the side of the condenser adjacent thereto.

When a given moisture sorption unit is operating in the desorption mode, the at least one heating element is configured to provide heat that causes release of water vapor from at least a portion of the water capture material.

In some variations, the moisture sorption units are configured to operate together such that the first moisture sorption unit operates in the adsorption mode when the second moisture sorption unit operates in the desorption mode, and the first moisture sorption unit operates in the desorption mode when the second moisture sorption unit operates in the adsorption mode.

The condenser is configured to condense the water vapor released from the moisture sorption unit in the desorption mode and to produce liquid water.

Figure 1:
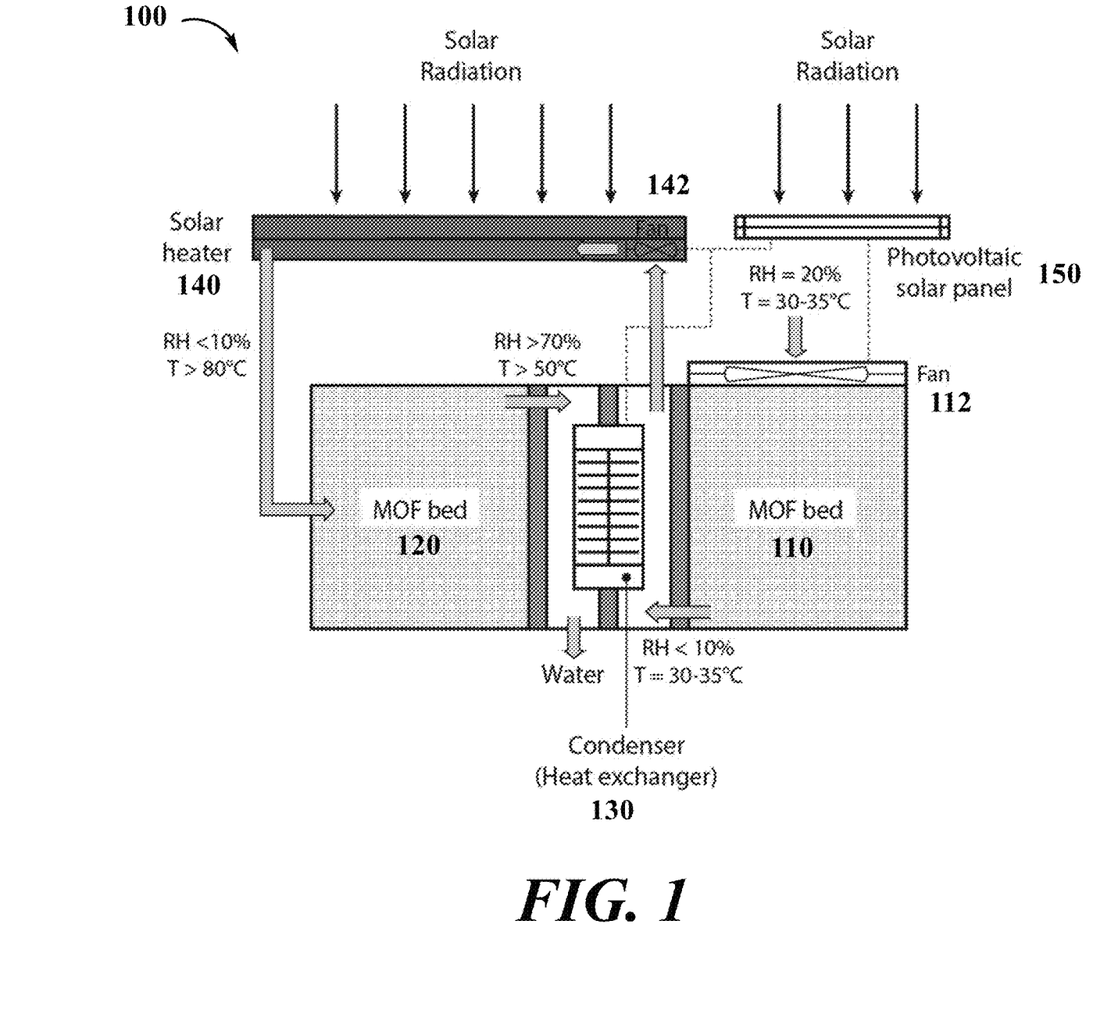
FIG. 1 depicts an exemplary schematic of an active atmospheric moisture harvester and illustrates the connections and air flows (along with temperature and relative humidity ranges) between separate units units. The solar heater and the photovoltaic solar panel use natural sunlight to power the harvester with heat and electricity respectively. The two MOF beds shown in the figure can be interchanged to cycle between desoprtion and water adsorption. The liquid water is collected in the condenser.

With reference to FIG. 1, system 100 is an exemplary active atmospheric moisture harvester system. System 100 includes two moisture sorption units 110 and 120 (labeled as "MOF bed" in the figure). Each moisture sorption unit contains water capture material (not depicted). In FIG. 1, the water capture material is MOF. In other variations, other suitable water capture materials may be used.

As depicted in FIG. 1, moisture sorption unit 110 is operating in adsorption mode, whereas moisture sorption unit 120 is operating in desorption mode. Each moisture sorption unit is equipped with at least one fan. In particular, moisture sorption unit 110 has fan 112, which directs surrounding air into moisture sorption unit 110. The surrounding air comes into contact with the water capture material, and at least a portion of the water capture material adsorbs moisture from the surrounding air.

It should be understood that although one fan is depicted as part of moisture sorption unit 110, in other variations, the moisture sorption unit may be equipped with a plurality of fans. Moreover, although fan 112 is depicted at the top of moisture sorption unit 110, in other variations, the fan may be positioned in other areas of the moisture sorption unit (e.g., on the side and/or bottom). It should be further understood that moisture sorption unit 120 is also equipped with a fan, which is not depicted in FIG. 1 since moisture sorption unit 120 is operating in desorption mode.

With reference again to FIG. 1, system 100 further includes condenser 130 positioned in between moisture sorption units 110 and 120. As depicted, condenser 130 is involved in condensing water vapor released from the water capture material of moisture sorption unit 120 operating in desorption mode, which is further discussed below. The side of condenser 130 adjacent to moisture sorption unit 110 operating in adsorption mode has a higher average temperature than the side of the condenser adjacent to moisture sorption unit 120 operating in the desorption mode.

System 100 further includes a heating element that includes solar heater 140, equipped with fan 142. It should be understood that although one fan is depicted in solar heater 140, in other variations, the solar heater may be equipped with a plurality of fans. Solar heater 140 is positioned externally to each moisture sorption unit, and is configured to heat air surrounding moisture sorption unit 120 operating in the desorption mode to indirectly provide heat that causes release of water vapor from the water capture material, which is saturated from a preceding adsorption phase.

Fan 112 also directs air out of moisture sorption unit 110, which cools the side of condenser 130 adjacent to moisture sorption unit 110 and helps to capture energy released from the condensation of the water vapor released from moisture sorption unit 120. Fan 142 helps draw the air used to cool condenser 130 into solar heater 140, which further warms this air. Solar heater 140 releases hot air that indirectly heats the water capture material as described above.

Once moisture sorption unit 110 completes the adsorption phase and moisture sorption unit 120 completes the desorption phase, the two units switch modes. Although not depicted in FIG. 1, moisture sorption unit 110 will then operate in desorption mode and moisture sorption unit 120 will then operate in adsorption mode.

With reference again to FIG. 1, system 100 further includes a power source, such as photovoltaic solar panel 150, which powers the fans and/or the condenser. In other variations, the power source may be an electrical source, or a combination of power sources may also be used.

Figure 3A:
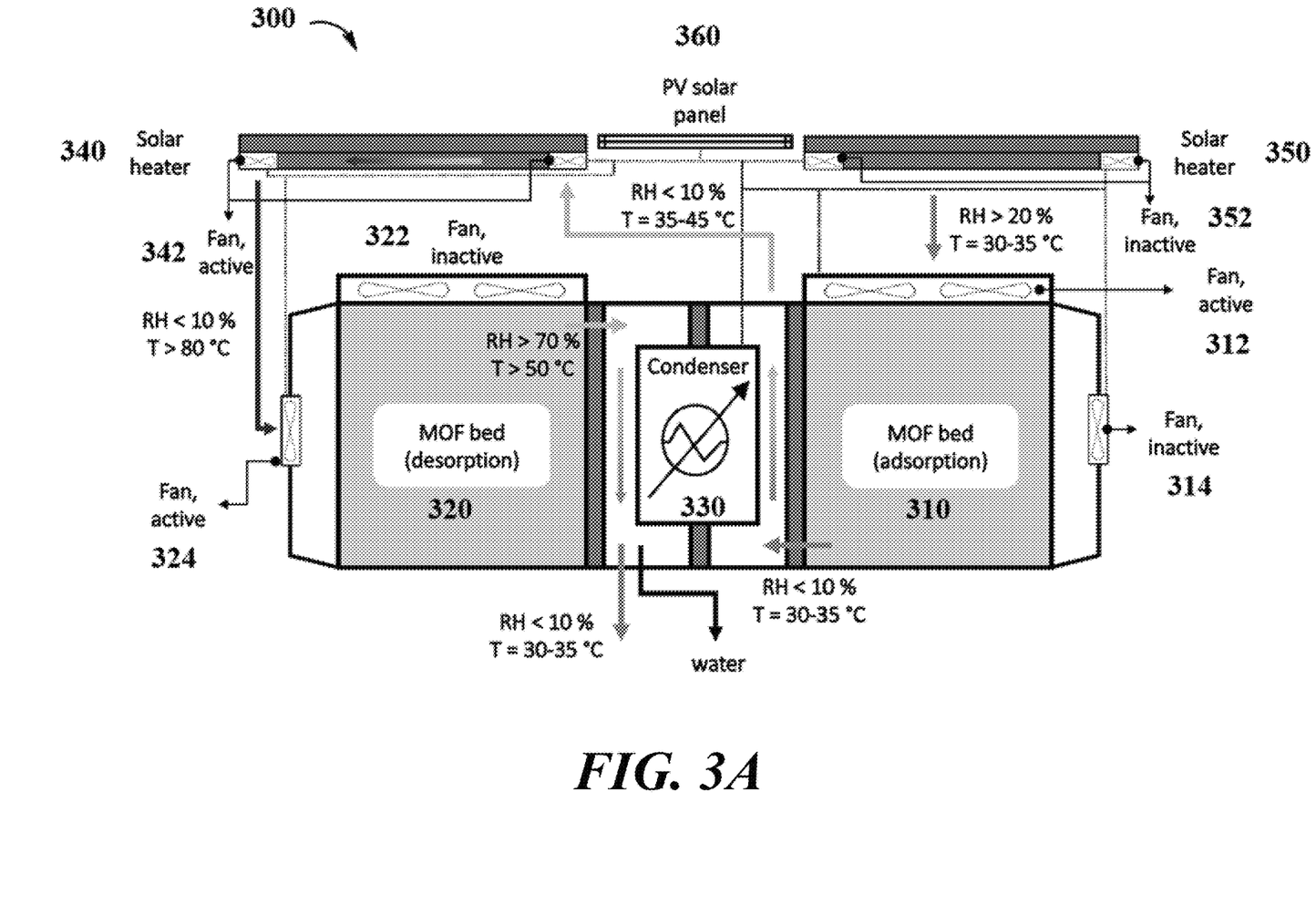
FIGS. 3A and 3B depict another exemplary active atmospheric moisture harvester that employs solar heaters as the heating element. This pair of figures show how each moisture sorption unit works together through a cycle of adsoprtion/desorption.
Figure 3B:
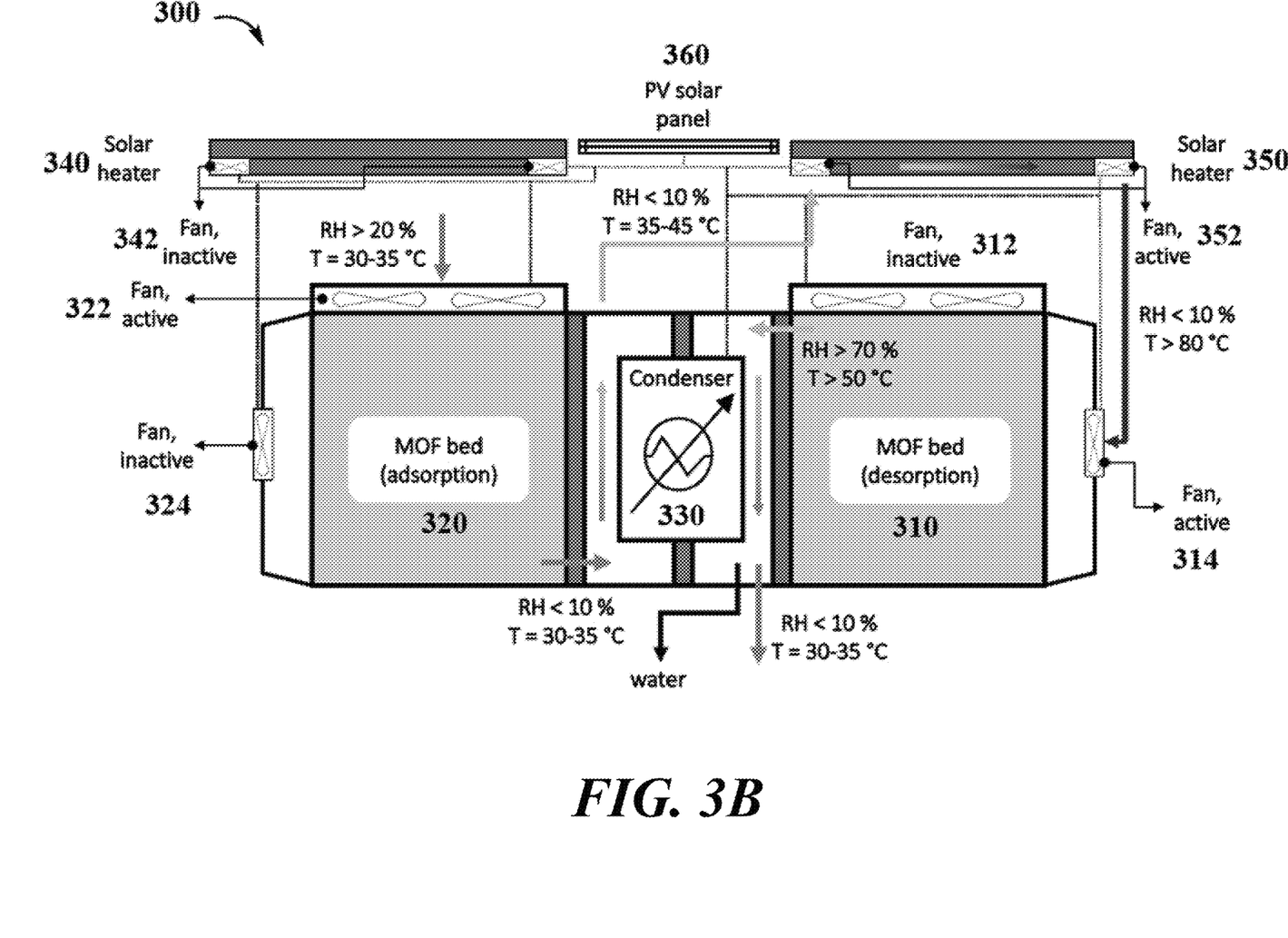

With reference to FIGS. 3A and 3B, system 300 is another exemplary active atmospheric moisture harvester system. System 300 includes two moisture sorption units 310 and 320 (labeled as "MOF bed" in the figure). Each moisture sorption unit contains water capture material (not depicted). In FIGS. 3A and 3B, the water capture material is MOF. In other variations, other suitable water capture materials may be used.

FIG. 3A depicts moisture sorption unit 310 operating in adsorption mode, and moisture sorption unit 320 operating in desorption mode. Moisture sorption unit 310 is equipped with fans 312 and 314. As shown in FIG. 3A, in adsorption mode, fan 312 is active, whereas fan 314 is inactive. Fan 312 directs surrounding air into moisture sorption unit 310. The surrounding air comes into contact with the water capture material, and at least a portion of the water capture material adsorbs moisture from the surrounding air.

It should be understood that the fans may be in any suitable position relative to the tray of water capture material. For example, fan 312 is depicted at the top of moisture sorption unit 310, in other variations, the fan may be positioned in other areas of the moisture sorption unit (e.g., on the side and/or bottom).

With reference again to FIGS. 3A and 3B, system 300 further includes condenser 330 positioned in between moisture sorption units 310 and 320. As depicted in FIG. 3A, condenser 330 condenses water vapor released from the water capture material of moisture sorption unit 320 operating in desorption mode to produce liquid water, which is further discussed below. The side of condenser 330 adjacent to moisture sorption unit 310 operating in adsorption mode has a higher average temperature than the side of the condenser adjacent to moisture sorption unit 320 operating in the desorption mode.

System 300 further includes a heating element that includes solar heaters 340 and 350, each equipped with at least one fan (e.g., fans 342 and 352, respectively). Solar heaters 340 and 350 are positioned externally to the moisture sorption units. In FIG. 3A, solar heater 340 is the active heating element, configured to heat air surrounding moisture sorption unit 320 operating in the desorption mode to indirectly provide heat that causes release of water vapor from the water capture material, which is saturated from a preceding adsorption phase.

With reference again to FIG. 3A, fan 312 also directs air out of moisture sorption unit 310 operating in adsorption mode, which cools the side of condenser 330 adjacent to moisture sorption unit 310 and helps to capture energy released from the condensation of the water vapor released from moisture sorption unit 320. Fan 342 helps draw the air used to cool condenser 330 into solar heater 340, which further warms this air. Fan 324 helps to draw the hot air from solar heater 340 towards moisture sorption unit 320 to heat the water capture material to release water vapor. Fan 324 can also help to direct the released water vapor towards condenser 330.

Once moisture sorption unit 310 completes the adsorption phase and moisture sorption unit 320 completes the desorption phase, the two units switch modes. FIG. 3B depicts moisture sorption unit 310 operating in desorption mode, and moisture sorption unit 320 operating in adsorption mode.

As shown in FIG. 3B, in adsorption mode, fan 322 is active, whereas fan 324 is inactive. Fan 322 directs surrounding air into moisture sorption unit 320. The surrounding air comes into contact with the water capture material, and at least a portion of the water capture material adsorbs moisture from the surrounding air. Fan 322 also directs air out of moisture sorption unit 320 operating in adsorption mode, which cools the side of condenser 330 adjacent to moisture sorption unit 320 and helps to capture energy released from the condensation of the water vapor released from moisture sorption unit 310 operating in the desoprtion mode.

With reference again to FIG. 3B, solar heater 350 is configured to heat air surrounding moisture sorption unit 310 operating in the desorption mode to indirectly provide heat that causes release of water vapor from the water capture material, which is saturated from a preceding adsorption phase (FIG. 3A). In FIG. 3B, fan 352 helps draw the air used to cool condenser 330 into solar heater 350, which further warms this air. Fan 314 is active, whereas fan 312 is inactive when moisture sorption unit 310 is operating in desorption mode. Fan 352 helps draw the air used to cool condenser 330 into solar heater 350, which further warms this air. Fan 314 helps to draw the hot air from solar heater 350 towards moisture sorption unit 310 to heat the water capture material to release water vapor. The air released from solar heater 350 indirectly heats the water capture material, which releases water vapor. Fan 314 can also help to direct the released water vapor towards condenser 330. Condenser 330 condenses the water vapor released from the water capture material of moisture sorption unit 310 operating in desorption mode, producing liquid water.

With reference again to FIG. 1 and FIGS. 3A and 3B, systems 100 and 300 further include a power source, such as photovoltaic solar panels 150 and 360, respectively, which power the fans and/or the condenser. In other variations, the power source may be an electrical source, or a combination of power sources may also be used.

FIGS. 1, 3A and 3B depict an external heating element in certain exemplary active atmospheric moisture harvester systems. However, the heating element may also be positioned internally to the moisture sorption units and directly heat the water capture material.

Figure 2:
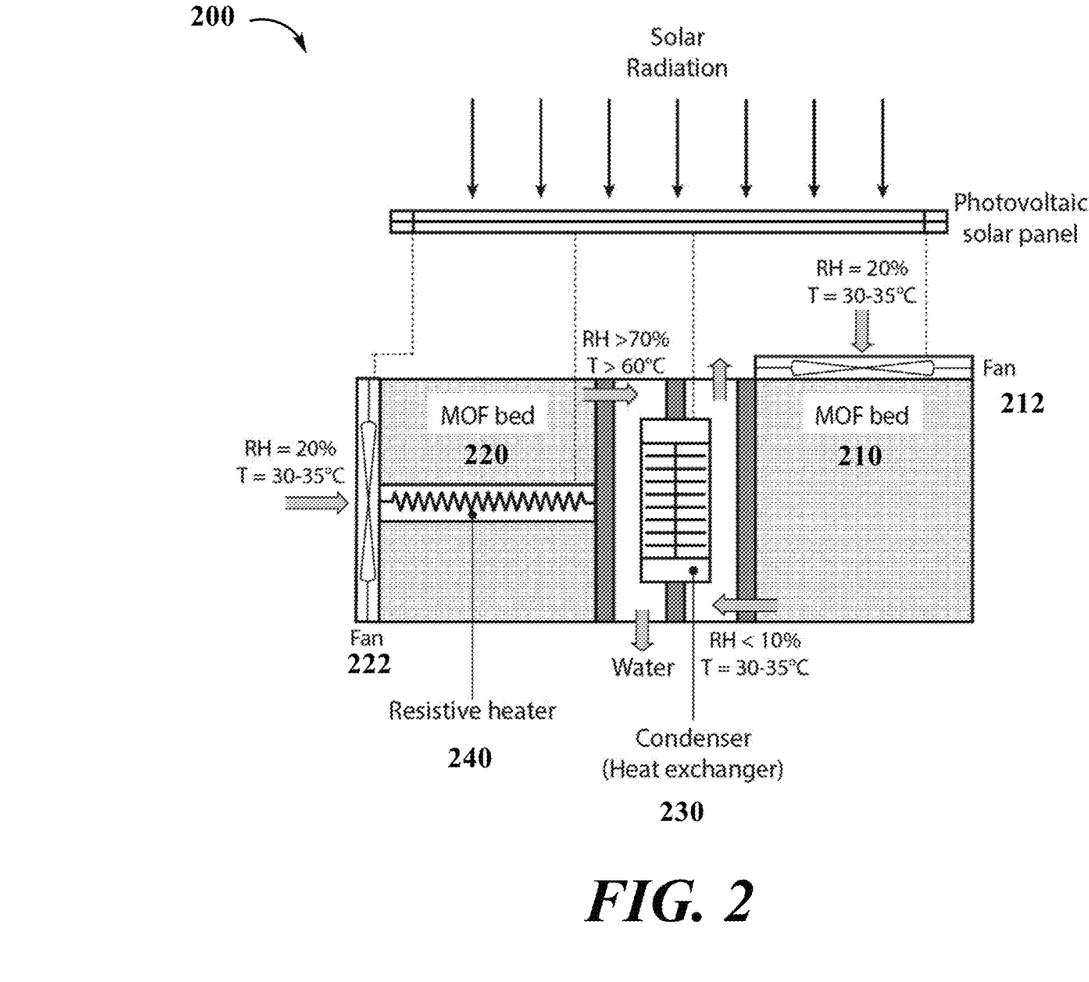
FIG. 2 depicts an exemplary schematic of another active atmospheric moisture harvester and illustrates the connections and air flows (along with temperature and relative humidity ranges) between separate units units. The photovoltaic solar panel uses natural sunlight to power the harvester with electricity for the fans and the resistive heater. The two MOF beds can be interchanged to cycle between desorption and water adsorption. The liquid water is collected in the condenser.

With reference to FIG. 2, system 200 depicts another exemplary active atmospheric moisture harvester system. System 200 includes two moisture sorption units 210 and 220 (labeled as "MOF bed" in the figure). Each moisture sorption unit contains water capture material (not depicted). In FIG. 2, the water capture material is MOF. In other variations, other suitable water capture materials may be used.

As depicted in FIG. 2, moisture sorption unit 210 is operating in adsorption mode, whereas moisture sorption unit 220 is operating in desorption mode. Each moisture sorption unit is equipped with at least one fan. Moisture sorption unit 210 has fan 212, and moisture sorption unit 220 has fan 222.

It should be understood that although one fan is depicted as part of moisture sorption unit 210, in other variations, the moisture sorption unit may be equipped with a plurality of fans. Moreover, it should be understood that the fans may be in any suitable position relative to the tray of water capture material. For example, although fan 212 is depicted at the top of moisture sorption unit 210, in other variations, the fan may be positioned in other areas of the moisture sorption unit (e.g., on the side and/or bottom).

With reference again to FIG. 2, system 200 further includes condenser 230 positioned in between moisture sorption units 210 and 220. As depicted, condenser 230 is involved in condensing water vapor released from the water capture material of moisture sorption unit 220 operating in desorption mode, which is further discussed below. The side of condenser 230 adjacent to moisture sorption unit 210 operating in adsorption mode has a higher average temperature than the side of the condenser adjacent to moisture sorption unit 220 operating in the desorption mode.

System 200 further includes a heating element positioned inside the moisture adsorption unit. The heating element in system 200 is resistive heater 240. It should be further understood that moisture sorption unit 210 is also equipped with a resistive heater, which is not depicted in FIG. 2 since moisture sorption unit 210 is operating in adsorption mode.

With reference again to FIG. 2, fan 212 in moisture sorption unit 210 operating in adsorption mode directs surrounding air into moisture sorption unit 210. The surrounding air comes into contact with the water capture material, and at least a portion of the water capture material adsorbs moisture from the surrounding air.

Fan 212 also directs air out of moisture sorption unit 210, which cools the side of condenser 230 adjacent to moisture sorption unit 210 and helps to capture energy released from the condensation of water vapor released from moisture sorption unit 220. The air that cools the condenser is then released back into the environment.

Resistive heater 240 directly heats the water capture material in moisture sorption unit 220, operating in desorption mode. The heat causes release of water vapor from the water capture material, which is saturated from a preceding adsorption phase. Fan 222 helps push the released water vapor towards condenser 230, which condenses the water vapor into liquid water.

Once moisture sorption unit 210 completes the adsorption phase and moisture sorption unit 220 completes the desorption phase, the two units switch modes. Although not depicted in FIG. 2, moisture sorption unit 210 will then operate in desorption mode and moisture sorption unit 220 will then operate in adsorption mode.

Figure 4A:
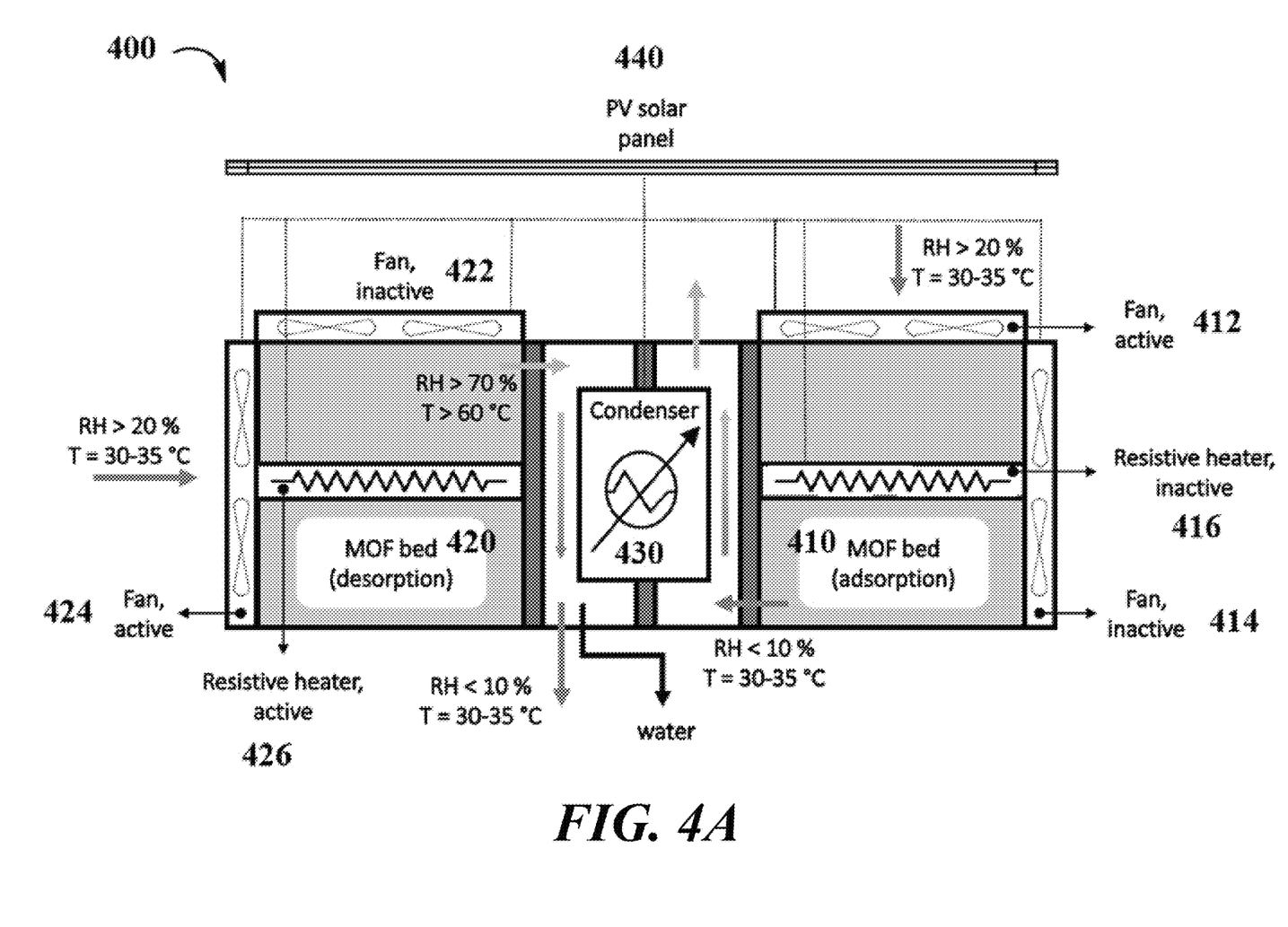
FIGS. 4A and 4B depict yet another exemplary active atmospheric moisture harvester that employs resistive heaters within the moisture sorption unit as the heating element. This pair of figures show how each moisture sorption unit works together through a cycle of adsoprtion/desorption.
Figure 4B:
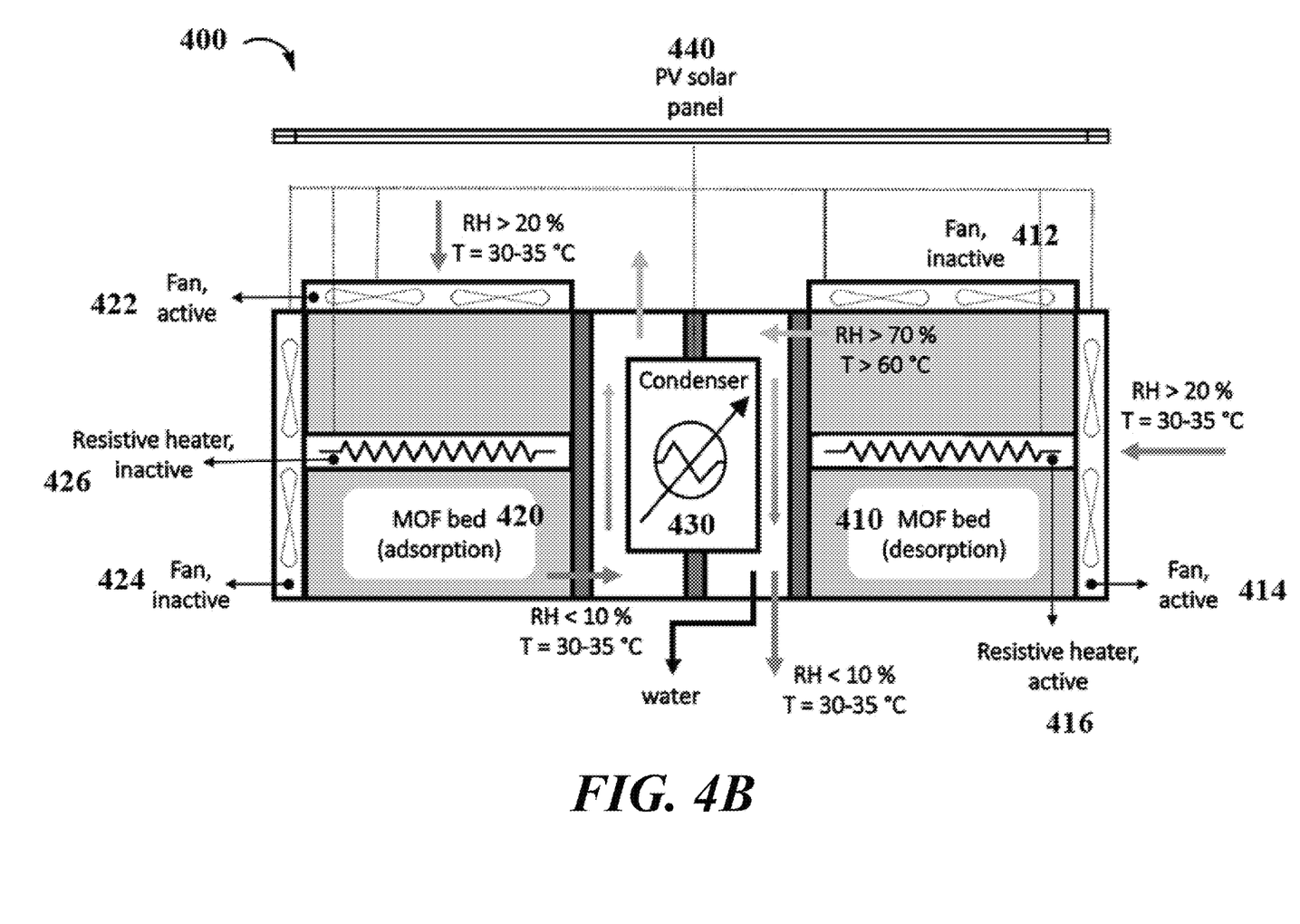

With reference to FIGS. 4A and 4B, system 400 depicts yet another exemplary active atmospheric moisture harvester system. System 400 includes two moisture sorption units 410 and 420 (labeled as "MOF bed" in the figure). Each moisture sorption unit contains water capture material (not depicted). In FIGS. 4A and 4B, the water capture material is MOF. In other variations, other suitable water capture materials may be used.

As depicted in FIG. 4A, moisture sorption unit 410 is operating in adsorption mode, whereas moisture sorption unit 420 is operating in desorption mode. Moisture sorption unit 410 has fans 412 and 414, and moisture sorption unit 420 has fans 422 and 424.

It should be understood that the fans may be in any suitable position relative to the tray of water capture material. For example, although fan 412 is depicted at the top of moisture sorption unit 410, in other variations, the fan may be positioned in other areas of the moisture sorption unit (e.g., on the side and/or bottom).

With reference again to FIGS. 4A and 4B, system 400 further includes condenser 430 positioned in between moisture sorption units 410 and 420. As depicted in FIG. 4A, condenser 430 is involved in condensing water vapor released from the water capture material of moisture sorption unit 420 operating in desorption mode, which is further discussed below. The side of condenser 430 adjacent to moisture sorption unit 410 operating in adsorption mode has a higher average temperature than the side of the condenser adjacent to moisture sorption unit 420 operating in the desorption mode.

System 400 further includes a heating element positioned inside the moisture adsorption unit. The heating element in system 400 includes resistive heaters 416 and 426. In FIG. 4A where moisture sorption unit 410 is operating in adsorption mode, resistive heater 416 is inactive. In FIG. 4B where moisture sorption unit 420 is operating in desorption mode, resistive heater 426 is active, as discussed in further detail below.

With reference again to FIG. 4A, fan 412 in moisture sorption unit 410 operating in adsorption mode directs surrounding air into moisture sorption unit 410. The surrounding air comes into contact with the water capture material, and at least a portion of the water capture material adsorbs moisture from the surrounding air.

Fan 412 also directs air out of moisture sorption unit 410, which cools the side of condenser 430 adjacent to moisture sorption unit 410 and helps to capture energy released from the condensation of water vapor released from moisture sorption unit 420. The air that cools the condenser is then released back into the environment.

Resistive heater 426 directly heats the water capture material in moisture sorption unit 420, operating in desorption mode. The heat causes release of water vapor from the water capture material, which is saturated from a preceding adsorption phase. Fan 424 helps push the released water vapor towards condenser 430, which condenses the water vapor into liquid water. Note that in desorption mode, fan 422 of moisture sorption unit 420 is inactive.

Once moisture sorption unit 410 completes the adsorption phase and moisture sorption unit 420 completes the desorption phase, the two units switch modes. As depicted in FIG. 4B, moisture sorption unit 420 is operating in adsorption mode, whereas moisture sorption unit 410 is operating in desorption mode.

As shown in FIG. 4B, in adsorption mode, fan 422 is active, whereas fan 424 is inactive. Fan 422 directs surrounding air into moisture sorption unit 420. The surrounding air comes into contact with the water capture material, and at least a portion of the water capture material adsorbs moisture from the surrounding air. Fan 422 also directs air out of moisture sorption unit 420 operating in adsorption mode, which cools the side of condenser 430 adjacent to moisture sorption unit 420, and helps to capture energy released from the condensation of the water vapor released from moisture sorption unit 410 operating in desorption mode.

With reference again to FIG. 4B, resistive heater 416 in moisture sorption unit 410 operating in desorption mode is active. Resistive heater 416 directly heats the water capture material in moisture sorption unit 410, operating in desorption mode. The heat causes release of water vapor from the water capture material, which is saturated from the preceding adsorption phase (FIG. 4A). In FIG. 4B, fan 414 is active, whereas fan 412 is inactive when moisture sorption unit 410 is operating in desorption mode. Fan 414 helps to direct water vapor released from the water capture material in moisture sorption unit 410 towards condenser 430, which condenses the water vapor released thereby producing liquid water.

With reference again to FIG. 2 and FIGS. 4A and 4B, systems 200 and 400 further include a power source, such as photovoltaic solar panels 250 and 440, respectively, which power the fans and/or the condenser. In other variations, the power source may be an electrical source, or a combination of power sources may also be used.

It should be understood that the exemplary systems in FIGS. 1. 2, 3A, 3B, 4A and 4B may include one or more additional elements. For example, in some variations, the system further includes a water collection tank and/or water storage tank. In other variations, the system further includes at least one sensor and at least one controller. For example, in one variation, the sensor(s) may be used to detect the saturation level of the water capture material in the moisture sorption unit operating in desorption mode. The sensors feed data to the controller, which then turns on the heating element when a predetermined saturation level is reached. The controller may also be used to turn fans on and off in the moisture sorption unit operating in adsorption mode.

Any suitable water capture material may be used in the moisture sorption units. In some embodiments, the water capture material comprises an active chemical compound. In some embodiments, such material captures moisture from air from the surroundings and then releases the captured moisture to the surroundings under external stimuli including but not limited to heating, moisture vapor pressure change or UV-radiation. The active chemical compound may be an ionic or covalent porous solid, including but not limited to metal-organic and organic porous framework materials, zeolites, organic ionic solids, inorganic ionic solids, organic molecular solids, or inorganic molecular solids. In some variations, the active chemical compound has a low heat capacity, high thermal conductivity and hydrothermal stability. It may be used in a pure, single phase form, as a composition of different active chemical materials, and/or in combination with performance enhancing additives modulating its properties. Performance enhancing additives may include materials with a high thermal conductivity and molar absorptivity. The active chemical compound may be used in the form of a powders, extrudates, molded bodies, pressed pellets, pure or composite films, or sintered bodies.

In some embodiments, the water capture material comprises metal-organic frameworks, also referred to in the art as MOFs. MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. In one variation, MOF-303 may be used, which has a structure of Al(OH)(HPDC), where HPDC stands for 1H-pyrazole-3,5-dicarboxylate. Other suitable MOFs may include, for example, MOF-801, MOF-841 and MIL-160. See e.g., Furukawa et al., J. Am. Chem. Soc. 2014, 136, 4369-4381. A combination of MOFs may also be used.

In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1D channels that allow for reversible water adsorption.

In some variations, the water capture material comprises at least one MOF and graphite. Any combinations of the water capture materials described herein may also be used.

In yet other aspects, the active atmospheric moisture harvester provided herein is a water production device built around three different units. The first unit is a solar heater where ambient air (typically at 30-40° C., and 20-30% RH) is heated to 80-90° C. and <10% RH by direct absorption of sunlight. This unit can be replaced by an electrical resistance if required by the atmospheric conditions. The second unit comprises two MOF beds in which water vapor can be reversibly adsorbed and desorbed by temperature swings. To adsorb water in the MOF ambient air is blown through the bed by a fan. Under ambient conditions, the MOF can capture atmospheric water in its pores, even in arid environments. The MOF bed is subsequently subjected to a stream of the hot and dry air blown from the solar heater by a fan, leading to the desorption of water of water molecules from the pores of the MOF (i.e. MOF desorption) and their transfer into the hot air stream. The resulting hot and wet air stream is transferred to the third unit: an active cooling device (e.g. thermoelectric, or compressor-based) in which the water vapor is condensed into liquid water. The device involves two MOF beds so that when one bed undergoes desorption, the other can be used to adsorb water to optimize the frequency of sorption/desorption cycles.

In some embodiments, the MOF bed is constituted of water-stable and structurally robust metal-organic framework, including (but not limited to) MOF-801 [$Zr_6O_4(OH)_4$(fumarate)$_6$], MOF-841 [$Zr_6O_4(OH)_4$(MTB)$_3$(H$_2$O)$_2$, MTB=4,4',4'',4'''-methanetetrayltetrabenzoate], aluminum fumarate [Al(OH)(fumarate)], CAU-10 [Al(OH)(benzene-1,3-dicarboxylate)], MOF-303 [Al(OH)(HPDC), HPDC=1H-pyrazole-3,5-dicarboxylate]. In general, the MOFs are selected based on their good water adsorption properties: maximum water capture capacity, water sorption/desorption kinetics, water productivity.

In certain aspects, provided are also methods of harvesting water from surrounding air using any of the atmospheric moisture harvester systems described herein. In one aspect, the method comprises: directing surrounding air towards at least one tray of water capture material in a first moisture sorption unit operating in an adsorption mode, which causes at least a portion of the water capture material adsorbs moisture from the surrounding air; directing air out of the first moisture sorption unit to cool the side of the condenser adjacent thereto; heating a second moisture sorption unit operating in a desorption phase to release water vapor is released from at least a portion of the water capture material; and condensing the released water vapor using the condenser to produce liquid water. In some embodiments, the first moisture sorption unit and the second moisture sorption unit operate together such that the first moisture sorption unit operates in the adsorption mode when the second moisture sorption unit operates in the desorption mode.

With reference again to FIGS. 1, 3A and 3B, the exemplary systems depicted therein have heating element(s) positioned externally to the second moisture sorption unit. In such embodiments, the heating of the moisture sorption unit comprises directing air released from the first moisture sorption unit operating in the adsorption mode into the solar heater; and heating air surrounding the second moisture sorption unit operating in the desorption mode to indirectly provide heat to release water vapor from at least a portion of the water capture material therein.

With reference again to FIGS. 2, 4A and 4B, the exemplary systems depicted therein have heating element(s) positioned within the second moisture sorption unit. In such embodiments, the heating of the moisture sorption unit comprises directly heating the water capture material therein to release water vapor from at least a portion of the water capture material therein. In some variations, the heating element positioned within a moisture sorption unit is at least one resistive heater. The resistive heater is positioned within the tray and in contact with the water capture material. In some variations, the resistive heater is configured to uniformly heat the saturated water capture material in the desorption phase to release water vapor.

After the moisture sorption unit operating in the adsorption mode completes the adsorption phase and the moisture sorption unit operating in the desorption mode completes the desorption phase, the two units switch modes to complete the adsorption/desorption cycle.

Thus, in some variations, the method further comprises: switching modes in the first moisture sorption unit and the second moisture sorption unit after adsorption is completed in the first moisture sorption unit and desorption is completed in the second moisture sorption unit. The first moisture sorption unit operates in the desorption mode when the second moisture sorption unit operates in the adsorption mode. The method then further comprises: directing surrounding air towards at least one tray of water capture material in the second moisture sorption unit, and wherein at least a portion of the water capture material adsorbs moisture from the surrounding air; directing air out of the second moisture sorption unit to at least partially cool the side of the condenser adjacent thereto; heating the first moisture sorption unit to release water vapor from at least a portion of the water capture material; and condensing the released water vapor using the condenser to produce additional liquid water.

The liquid water obtained from the moisture sorption units may be collected and/or stored for future use.

The disclosed active atmospheric moisture harvesters and methods are able produce liquid water in arid places on a scale suitable for human consumption and water-related human activities. Using this robust and conceptually simple unit, populations suffering the most from the forthcoming rise in temperature can harvest freshwater directly from the atmosphere to meet their essential needs. The harvested water is suitable for human consumption and can also be used for irrigation of crops.

Enumerated Embodiments

The following enumerated embodiments are representative of some aspects of the invention.

1. An atmospheric water harvester system comprising two metal-organic framework (MOF) beds, a heater, a photovoltaic panel which powers two fans, and a condenser having two sides, operatively configured into:

a) an adsorption mode wherein ambient air is blown by one of the fans through one of the MOF beds to one side of the condenser, wherein the MOF adsorbs water from the ambient air to form dried air;

b) a regeneration mode wherein the dried air is blown by the other fan through the other MOF bed to the other side the condenser, wherein heater heats the dried air, the heated dried air desorbs water from the MOF, and the humidified air releases the water at the condenser; and wherein the MOF beds are interchangeable to cycle between the regeneration and water adsorption modes.

2. The harvester system of embodiment 1 wherein the heater is a solar heater.

3. The harvester system of embodiment 1 wherein the heater is an electrical heater, preferably powered by a photovoltaic panel, preferably by the same panel which powers the fans.

4. The harvester system of embodiment 1, 2 or 3 wherein:
a) the ambient air is 30-40 C;
b) the heated air is 80-90 C;
c) the dried air is <10% relative humidity;
d) the humidified air is >70% relative humidity; and/or
e) the system produces 1 liter per kilogram of sorbent per day. 5. The harvester system of embodiment 1, 2, 3 or 4 wherein the MOF metal is selected from zirconium, nickel, iron, copper, manganese and aluminum, such as:
MOF-801 [$Zr_6O_4(OH)_4(fumarate)_6$],
MOF-841 [$Zr_6O_4(OH)_4(MTB)_3(H_2O)_2$, wherein MTB is 4,4',4'',4'''-methanetetrayltetrabenzoate],
aluminum fumarate [Al(OH)(fumarate)],
CAU-10 [Al(OH)(benzene-1,3-dicarboxylate)], or
MOF-303 [Al(OH)(HPDC), HPDC=1H-pyrazole-3,5-dicarboxylate].

6. A method of harvesting atmospheric water comprising operating the harvester system of embodiment 1, 2, 3, 4 or 5.

7. An atmospheric moisture harvester system, comprising:
a first moisture sorption unit and a second moisture sorption unit,
wherein each moisture sorption unit independently comprises:
at least one fan, and
at least one tray configured to hold water capture material, and wherein each moisture sorption unit is configured to operate in one or more cycles, wherein each cycle comprises an adsorption mode followed by a desorption mode;

at least one heating element, positioned either (a) within each moisture sorption unit, or (b) externally to each moisture sorption unit;

a condenser, positioned in between the first moisture sorption unit and the second moisture sorption unit, wherein the side of the condenser adjacent to the moisture sorption unit in the adsorption mode has a higher average temperature than the side of the condenser adjacent to the moisture sorption unit in the desorption mode; and at least one power source, configured to power the fans and heating element in the system, wherein, for each moisture sorption unit in the adsorption mode, the at least one fan in the moisture sorption unit in the adsorption mode is configured to direct surrounding air towards the at least one tray of water capture material, and at least a portion of the water capture material adsorbs moisture from the surrounding air, and the at least one fan in the moisture sorption unit in the adsorption mode further directs air out of the moisture sorption unit in the adsorption mode to at least partially cool the side of the condenser adjacent thereto;

wherein, for each moisture sorption unit in the desorption mode, the at least one heating element is configured to provide heat that causes release of water vapor from at least a portion of the water capture material; and wherein the condenser is configured to condense the water vapor released from the moisture sorption unit in the desorption mode and to produce liquid water.

8. The system of embodiment 7, wherein the moisture sorption units are configured to operate together such that the first moisture sorption unit operates in the adsorption mode when the second moisture sorption unit operates in the desorption mode, and the first moisture sorption unit operates in the desorption mode when the second moisture sorption unit operates in the adsorption mode.

9. The system of embodiment 7 or 8, wherein the at least one heating element is positioned externally to each moisture sorption unit.

10. The system of embodiment 9, wherein the at least one heating element comprises at least one solar heater and at least one fan, wherein, the at least one fan in each heating element directs the air released from the moisture sorption unit in the adsorption mode into the at least one solar heater, and wherein the at least one solar heater is configured to heat air surrounding the moisture sorption unit in the desorption mode to indirectly provide heat that causes release of water vapor from at least a portion of the water capture material therein.

11. The system of embodiment 7 or 8, wherein the at least one heating element is positioned within each moisture sorption unit.

12. The system of embodiment 11, wherein the at least one heating element is incorporated into the at least one tray and in contact with at least a portion of the water capture material 13. The system of embodiment 11 or 12, wherein the at least one heating element is at least one resistive heater configured to directly heat the water capture material that causes release of water vapor from at least a portion of the water capture material in the moisture sorption unit in the desorption mode.

14. The system of any one of embodiments 7 to 13, further comprising a water storage tank.

15. The system of any one of embodiments 7 to 14, wherein the power source comprises at least one solar panel, or an electrical power source, or a combination thereof.

16. The system of any one of embodiments 7 to 15, further comprising:
at least one sensor, configured to detect the saturation level of the water capture material in each moisture sorption unit; and
at least one controller, configured to receive input from the at least one sensor regarding the saturation level of the water capture material in each moisture sorption unit, and to turn on the heating element when a predetermined saturation level is reached.

17. The system of any one of embodiments 7 to 16, wherein the water capture material comprises metal-organic framework.

18. The system of embodiment 17, wherein the metal-organic framework is:
MOF-801 [$Zr_6O_4(OH)_4$(fumarate)$_6$],
MOF-841 [$Zr_6O_4(OH)_4(MTB)_3(H_2O)_2$, wherein MTB is 4,4',4'',4'''-methanetetrayltetrabenzoate],
aluminum fumarate [Al(OH)(fumarate)],
CAU-10 [Al(OH)(benzene-1,3-dicarboxylate)], or
MOF-303 [Al(OH)(HPDC), HPDC=1H-pyrazole-3,5-dicarboxylate],
or any combination thereof.

19. A method of harvesting water from surrounding air using an atmospheric moisture harvester system comprising a first moisture sorption unit, a second moisture sorption unit, and a condenser, wherein the condenser is positioned in between the first moisture sorption unit and the second moisture sorption unit,
the method comprising:
directing surrounding air towards at least one tray of water capture material in a first moisture sorption unit of the atmospheric moisture harvester system, wherein the first moisture sorption unit is operating in an adsorption mode, and wherein at least a portion of the water capture material adsorbs moisture from the surrounding air;
directing air out of the first moisture sorption unit to at least partially cool the side of the condenser adjacent thereto;
heating a second moisture sorption unit of the atmospheric moisture harvester system to release water vapor is released from at least a portion of the water capture material, wherein the second moisture sorption unit is operating in a desorption phase; and
condensing the released water vapor using the condenser to produce liquid water, wherein the first moisture sorption unit and the second moisture sorption unit operate together such that the first moisture sorption unit operates in the adsorption mode when the second moisture sorption unit operates in the desorption mode.

20. The method of embodiment 19, wherein the heating of the second moisture sorption unit is performed by at least one heating element positioned externally to the second moisture sorption unit.

21. The method of embodiment 20, wherein the at least one heating element comprises at least one solar heater and at least one fan, and wherein the heating of the second moisture sorption unit comprises:
directing air released from the first moisture sorption unit operating in the adsorption mode into the at least one solar heater; and
heating air surrounding the second moisture sorption unit operating in the desorption mode to indirectly provide heat to release water vapor from at least a portion of the water capture material therein.

22. The method of embodiment 19, wherein the heating of the second moisture sorption unit is performed by at least one heating element positioned within the second moisture sorption unit.

23. The method of embodiment 22, wherein the at least one heating element is in contact with at least a portion of the water capture material in the second moisture sorption unit.

24. The method of embodiment 22 or 23, wherein the at least one heating element is at least one resistive heater, and wherein the heating of the second moisture sorption unit comprises directly heating the water capture material therein to release water vapor from at least a portion of the water capture material.

25. The method of any one of embodiments 19 to 24, further comprising collecting the liquid water.

26. The method of any one of embodiments 19 to 25, further comprising storing the liquid water.

27. The method of any one of embodiments 19 to 26, further comprising:
switching modes in the first moisture sorption unit and the second moisture sorption unit after adsorption is completed in the first moisture sorption unit and desorption is completed in the second moisture sorption unit, wherein the first moisture sorption unit operates in the desorption mode when the second moisture sorption unit operates in the adsorption mode.

28. The method of embodiment 27, further comprising:
directing surrounding air towards at least one tray of water capture material in the second moisture sorption unit, and wherein at least a portion of the water capture material adsorbs moisture from the surrounding air;
directing air out of the second moisture sorption unit to at least partially cool the side of the condenser adjacent thereto;
heating the first moisture sorption unit to release water vapor from at least a portion of the water capture material; and
condensing the released water vapor using the condenser to produce additional liquid water.

29. The method of any one of embodiments 19 to 27, wherein the water capture material comprises metal-organic framework.

30. The method of embodiment 29, wherein the metal-organic framework is:
MOF-801 [$Zr_6O_4(OH)_4$(fumarate)$_6$],
MOF-841 [$Zr_6O_4(OH)_4(MTB)_3(H_2O)_2$, wherein MTB is 4,4',4'',4'''-methanetetrayltetrabenzoate],
aluminum fumarate [Al(OH)(fumarate)],
CAU-10 [Al(OH)(benzene-1,3-dicarboxylate)], or
MOF-303 [Al(OH)(HPDC), HPDC=1H-pyrazole-3,5-dicarboxylate],
or any combination thereof.

REFERENCES (1) Gleick, P. H. *Water in crisis: a guide to the world's fresh water resources*; Oxford University Press: New York, 1993.
(2) Park, K.-C.; Chhatre, S. S.; Srinivasan, S.; Cohen, R. E.; McKinley, G. H. *Langmuir* 2013, 29 (43), 13269-13277.

(3) Klemm, O.; Schemenauer, R. S.; Lummerich, A.; Cereceda, P.; Marzol, V.; Corell, D.; van Heerden, J.; Reinhard, D.; Gherezghiher, T.; Olivier, J.; Osses, P.; Sarsour, J.; Frost, E.; Estrela, M. J.; Valiente, J. A.; Fessehaye, G. M. *Ambio* 2012, 41 (3), 221-234.

(4) Schemenauer, R. S.; Cereceda, P. *J. Appl. Meteorol.* 1994, 33 (11), 1313-1322.

(5) Wahlgren, R. V. *Water Res.* 2001, 35 (1), 1-22.

(6) Muselli, M.; Beysens, D.; Marcillat, J.; Milimouk, I; Nilsson, T.; Louche, A. *Atmos. Res.* 2002, 64, 297-312.

(7) Clus, O.; Ortega, P.; Muselli, M.; Milimouk, I.; Beysens, D. *J. Hydrol.* 2008, 361, 159-171.

(8) Lee, A.; Moon, M.-W.; Lim, H.; Kim, W.-D.; Kim, H.-Y. *Langmuir* 2012, 28, 10183-10191.

(9) Furukawa, H.; Gandara, F.; Zhang, Y.-B.; Jiang, J.; Queen, W.-L.; Hudson, M. R.; Yaghi, O. M. *J. Am. Chem. Soc.* 2014, 136, 4369-4381.

(10) Fathieh, F.; Kalmutzki, M. J.; Kapustin, E. A.; Waller, P. J.; Yang, J.; Yaghi, O. M. *Sci. Adv.* 2018, 4, eaat3198

(11) Canivet, J.; Fateeva, A.; Guo, Y.; Coasne, B.; Farrusseng, D. *Chem. Soc. Rev.* 2014, 43, 5594-5617.

The invention claimed is:

1. An atmospheric moisture harvester system comprising two metal-organic framework (MOF) beds, a heater, a photovoltaic panel which powers two fans, and a condenser having two sides, operatively configured into:
   a) an adsorption mode wherein ambient air is blown by one of the fans through one of the MOF beds to one side of the condenser, wherein the MOF adsorbs water from the ambient air to form dried air;
   b) a regeneration mode wherein the dried air is blown by the other fan through the other MOF bed to the other side the condenser, wherein the heater heats the dried air, the heated dried air desorbs water from the MOF to produce humidified air, and the humidified air releases the water at the condenser; and
   wherein the MOF beds are interchangeable to cycle between the regeneration and water adsorption modes.

2. The system of claim 1, wherein the heater is a solar heater.

3. The system of claim 1, wherein the heater is an electrical heater.

4. The system of claim 3, wherein the heater is powered by a photovoltaic panel.

5. The system of claim 4, wherein the photovoltaic panel also powers the fans.

6. The system of claim 1, wherein:
   a) the ambient air is 30-40° C.;
   b) the heated air is 80-90° C.;
   c) the dried air is <10% relative humidity;
   d) the humidified air is >70% relative humidity; and
   e) the system produces 1 liter of water per kilogram of sorbent per day.

7. The system of claim 1, wherein the MOF metal is selected from zirconium, nickel, iron, copper, manganese and aluminum.

8. The system of claim 1, wherein the MOF is:
MOF-801 [$Zr_6O_4(OH)_4$(fumarate)$_6$],
MOF-841 [$Zr_6O_4(OH)_4$(MTB)$_3$ $(H_2O)_2$, wherein MTB is 4,4',4'',4'''-methanetetrayltetrabenzoate],
aluminum fumarate [Al(OH)(fumarate)],
CAU-10 [Al(OH)(benzene-1,3-dicarboxylate)], or
MOF-303 [Al(OH)(HPDC), HPDC=1H-pyrazole-3,5-dicarboxylate].

9. A method of harvesting atmospheric water comprising operating the system of claim 1.

10. An atmospheric moisture harvester system, comprising:
   a first moisture sorption unit and a second moisture sorption unit,
      wherein each moisture sorption unit independently comprises:
         at least one fan, and
         at least one tray configured to hold water capture material, and
      wherein each moisture sorption unit is configured to operate in one or more cycles, wherein each cycle comprises an adsorption mode followed by a desorption mode;
   at least one heating element, positioned either (a) within each moisture sorption unit, or
(b) externally to each moisture sorption unit;
   a condenser, positioned in between the first moisture sorption unit and the second moisture sorption unit, wherein the side of the condenser adjacent to the moisture sorption unit in the adsorption mode has a higher average temperature than the side of the condenser adjacent to the moisture sorption unit in the desorption mode; and
   at least one power source, configured to power the fans and heating element in the system,
wherein, for each moisture sorption unit in the adsorption mode,
   the at least one fan in the moisture sorption unit in the adsorption mode is configured to direct surrounding air towards the at least one tray of water capture material, and at least a portion of the water capture material adsorbs moisture from the surrounding air, and
   the at least one fan in the moisture sorption unit in the adsorption mode further directs air out of the moisture sorption unit in the adsorption mode to at least partially cool the side of the condenser adjacent thereto;
wherein, for each moisture sorption unit in the desorption mode,
   the at least one heating element is configured to provide heat that causes release of water vapor from at least a portion of the water capture material; and
wherein the condenser is configured to condense the water vapor released from the moisture sorption unit in the desorption mode and to produce liquid water.

11. The system of claim 10, wherein the moisture sorption units are configured to operate together such that the first moisture sorption unit operates in the adsorption mode when the second moisture sorption unit operates in the desorption mode, and the first moisture sorption unit operates in the desorption mode when the second moisture sorption unit operates in the adsorption mode.

12. The system of claim 10, wherein the at least one heating element is positioned externally to each moisture sorption unit.

13. The system of claim 12, wherein the at least one heating element comprises at least one solar heater and at least one fan,
   wherein, the at least one fan in each heating element directs the air released from the moisture sorption unit in the adsorption mode into the at least one solar heater, and
   wherein the at least one solar heater is configured to heat air surrounding the moisture sorption unit in the desorption mode to indirectly provide heat that causes release of water vapor from at least a portion of the water capture material therein.

14. The system of claim 10, wherein the at least one heating element is positioned within each moisture sorption unit.

15. The system of claim 14, wherein the at least one heating element is incorporated into the at least one tray and in contact with at least a portion of the water capture material.

16. The system of claim 14, wherein the at least one heating element is at least one resistive heater configured to directly heat the water capture material that causes release of water vapor from at least a portion of the water capture material in the moisture sorption unit in the desorption mode.

17. The system of claim 10, further comprising a water storage tank.

18. The system of claim 10, wherein the power source comprises at least one solar panel, or an electrical power source, or a combination thereof.

19. The system of claim 10, further comprising:
at least one sensor, configured to detect the saturation level of the water capture material in each moisture sorption unit; and
at least one controller, configured to receive input from the at least one sensor regarding the saturation level of the water capture material in each moisture sorption unit, and to turn on the heating element when a predetermined saturation level is reached.

20. The system of claim 10, wherein the water capture material comprises a metal-organic framework.

21. The system of claim 10, wherein the water capture material comprises MOF-801, MOF-841, aluminum fumarate, CAU-10, or MOF-303, or any combination thereof.

22. A method of harvesting water from surrounding air using an atmospheric moisture harvester system of claim 10, the method comprising:
directing surrounding air towards at least one tray of water capture material in a first moisture sorption unit of the atmospheric moisture harvester system, wherein the first moisture sorption unit is operating in an adsorption mode, and wherein at least a portion of the water capture material adsorbs moisture from the surrounding air;
directing air out of the first moisture sorption unit to at least partially cool the side of the condenser adjacent thereto;
heating a second moisture sorption unit of the atmospheric moisture harvester system to release water vapor is released from at least a portion of the water capture material, wherein the second moisture sorption unit is operating in a desorption phase; and
condensing the released water vapor using the condenser to produce liquid water, wherein the first moisture sorption unit and the second moisture sorption unit operate together such that the first moisture sorption unit operates in the adsorption mode when the second moisture sorption unit operates in the desorption mode.

* * * * *